United States Patent
Kitamura

(10) Patent No.: US 8,311,307 B2
(45) Date of Patent: Nov. 13, 2012

(54) STRUCTURE DETECTION APPARATUS AND METHOD, AND COMPUTER-READABLE MEDIUM STORING PROGRAM THEREOF

(75) Inventor: Yoshiro Kitamura, Tokyo (JP)

(73) Assignee: Fujifilm Corporation, Toyko (JP)

( * ) Notice: Subject to any disclaimer, the term of this patent is extended or adjusted under 35 U.S.C. 154(b) by 214 days.

(21) Appl. No.: 12/901,071

(22) Filed: Oct. 8, 2010

(65) Prior Publication Data

US 2011/0085701 A1   Apr. 14, 2011

(30) Foreign Application Priority Data

Oct. 8, 2009  (JP) ................................ 2009-234098
Oct. 1, 2010  (JP) ................................ 2010-224061

(51) Int. Cl.
*G06K 9/00* (2006.01)
(52) U.S. Cl. ........................................................ 382/131
(58) Field of Classification Search .................... 382/131
See application file for complete search history.

(56) References Cited

U.S. PATENT DOCUMENTS

| 7,346,209 B2* | 3/2008 | Gokturk et al. ............... 382/159 |
| 7,418,121 B2* | 8/2008 | Kasai ........................... 382/128 |
| 7,646,903 B2 | 1/2010 | Kaftan et al. |
| 8,103,101 B2 | 1/2012 | Fujiwara et al. |
| 2003/0171668 A1* | 9/2003 | Tsujino et al. ................ 600/407 |
| 2005/0207630 A1* | 9/2005 | Chan et al. ................... 382/131 |
| 2008/0044080 A1* | 2/2008 | Li ................................. 382/155 |

FOREIGN PATENT DOCUMENTS

| JP | 2707369 | 9/1992 |
| JP | 2007-35020 | 2/2007 |
| JP | 2007-312892 | 12/2007 |

OTHER PUBLICATIONS

K.P. Murphy et al., "Loopy Belief Propagation for Approximate Inference: An Empirical Study", Uncertainty in Artificial Intelligence, pp. 467-475, 1999.
V. Kolmogorov, "Convergent Tree—Reweighted Message Passing for Energy Minimazation" in PAMI, pp. 1568-1583, 2006.
L. Torresani et al., "Feature Correspondence Via Graph Matching: Models and Global Optimization", in ECCV Part II, pp. 596-609, 2008.

\* cited by examiner

*Primary Examiner* — Vikkram Bali
(74) *Attorney, Agent, or Firm* — Young & Thompson

(57) ABSTRACT

A plurality of candidate points are extracted from image data. The plurality of candidate points are normalized, and a set of representative points composing form model that is most similar to set form is selected from the plurality of candidate points. Further, the candidate points and the form model are compared with each other, and correction is performed by adding a region forming structure or by deleting a region, or the like. Accordingly, the structure is detected in image data.

17 Claims, 8 Drawing Sheets

GRAPH (EDGE)

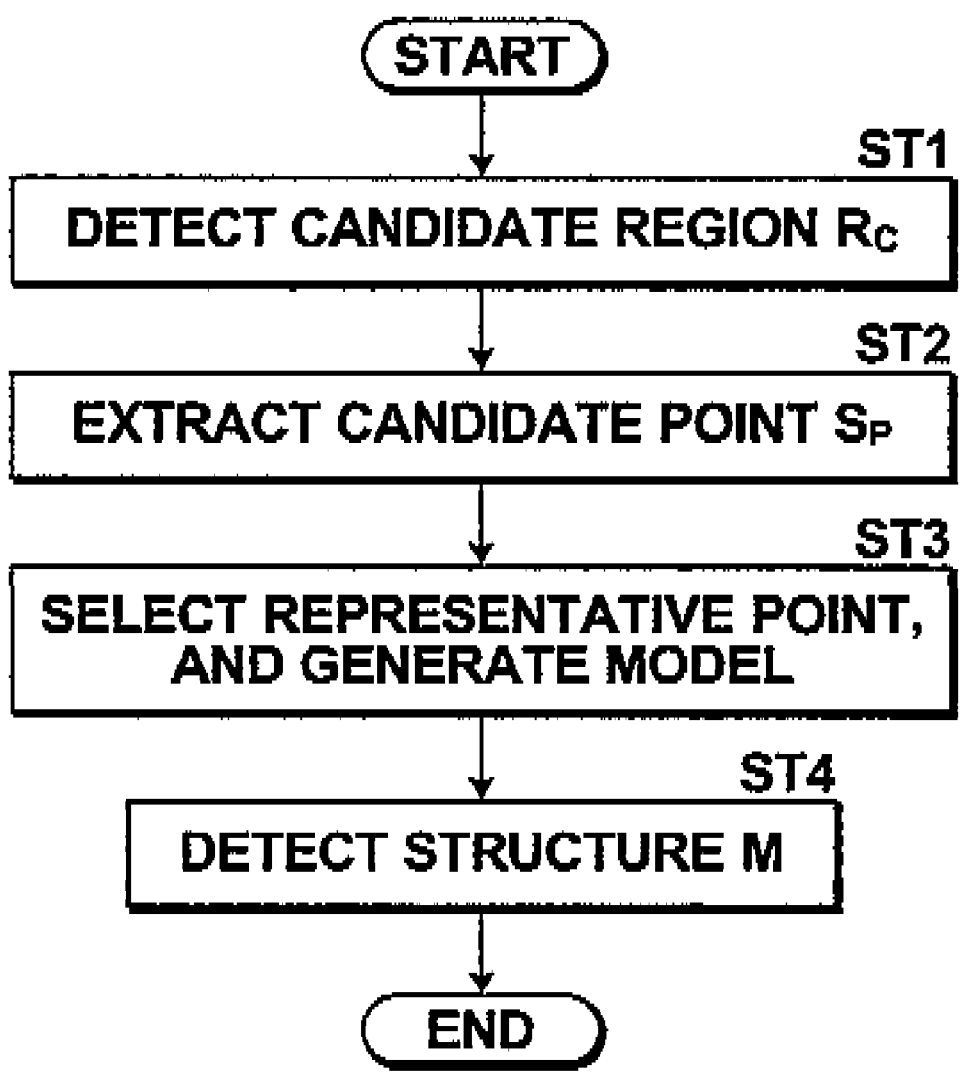

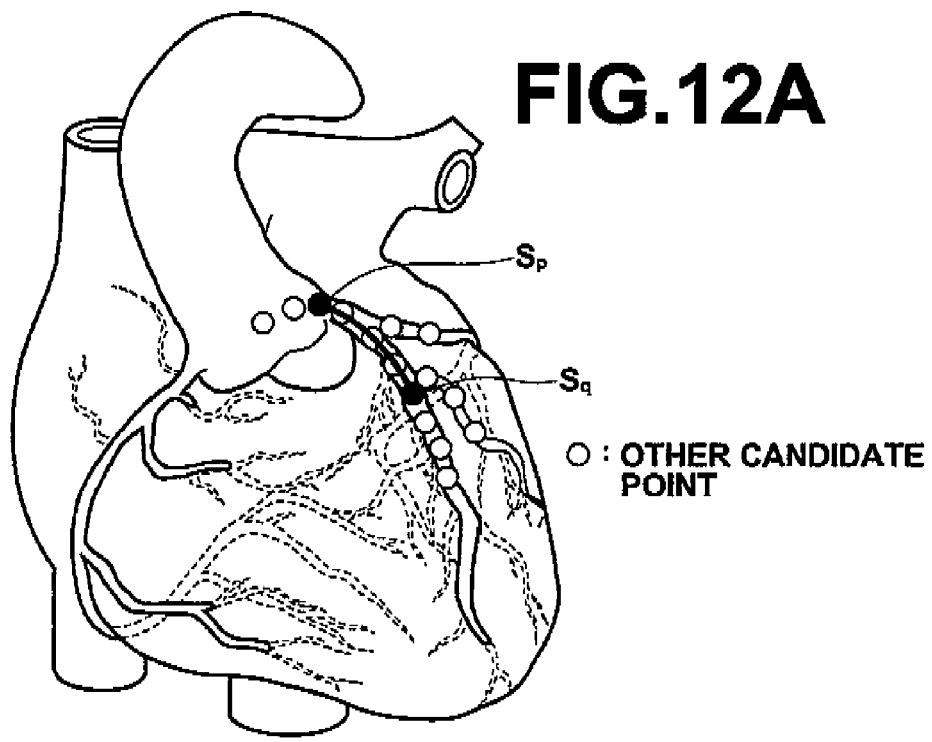
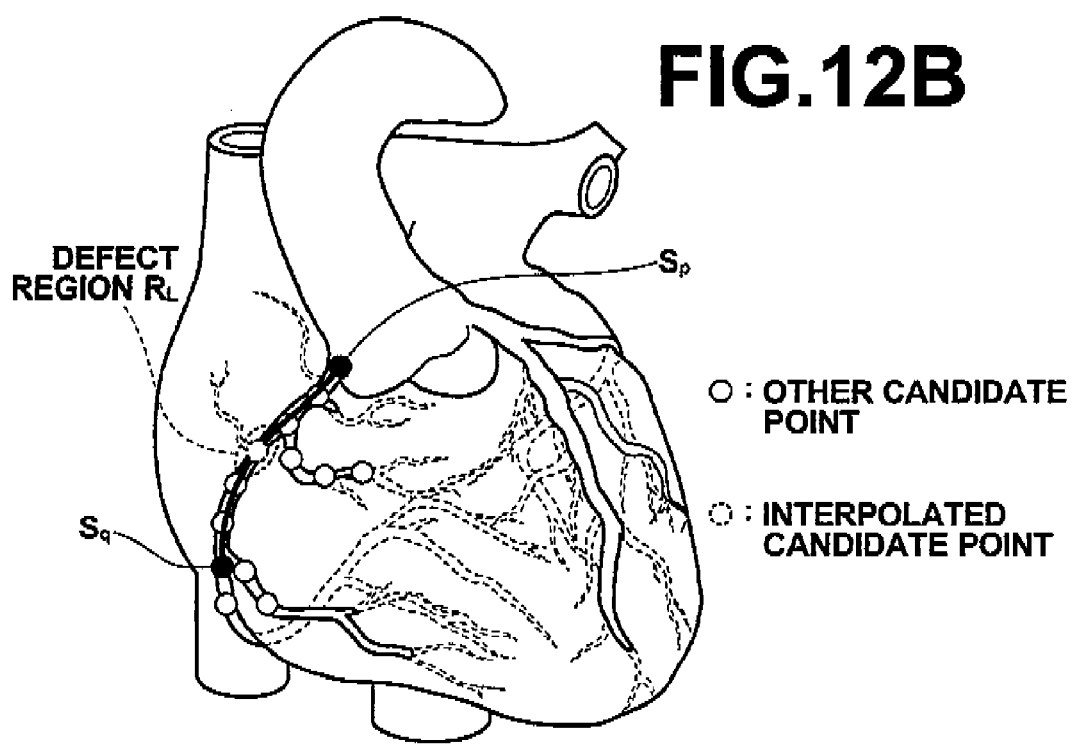

STRUCTURE DETECTION APPARATUS AND METHOD, AND COMPUTER-READABLE MEDIUM STORING PROGRAM THEREOF

BACKGROUND OF THE INVENTION

1. Field of the Invention

The present invention relates to a structure detection apparatus and method for detecting a specific structure in a medical image, or the like. Further, the present invention relates to a computer-readable recording medium storing a structure detection program.

2. Description of the Related Art

An advance in medical equipment (such as a multi-detector CT for example) in recent years provided high-quality three-dimensional (3D) images that can be used in image diagnosis (diagnosis using images). A 3D image is composed of a multiplicity of two-dimensional (2D) images, and the data amount of the 3D image is large. Therefore, when a doctor uses the 3D image for diagnosis, it takes a long time to find a desired observation region in some cases. Therefore, a method for displaying a whole organ or a lesion in an easily recognizable manner has been attempted to improve the efficiency of diagnosis. In the method, an organ of interest is extracted, and displayed by MIP (maximum intensity projection), VR (volume rendering), CPR (curved planer restoration), or the like. For example, when a cardiac CT image is analyzed, and especially when a coronary artery is analyzed, it is necessary to extract the center path of the coronary artery as a graph structure to obtain a CPR image developed along the path of blood vessels and effective data for diagnosis, such as a stenosed region and the degree of stenosis.

A predetermined structure is automatically extracted from 3D image data, such as volume data (please refer to U.S. Pat. No. 7,646,903 (Patent Document 1) for example). In Patent Document 1, a tree structure is collected, for example, by respiratory tract-respiratory tract matching, or tree structures are collected from structures obtained at different time from each other. Further, a plurality of paths (nodes) are extracted from the collected tree structures, and tree matching (graph matching) is performed by using each of the extracted paths to measure the similarity of the graph structures.

Further, various methods have been proposed in extraction of structures on which matching is performed as described above (please refer to the specification of U.S. Pat. No. 7,346,209 (Patent Document 2) and U.S. Patent Application Publication No. 20080044080 (Patent Document 3) for example). For example, in Patent Document 2, three slice images that are orthogonal to each other are generated from 3D image data, and a specific object is detected based on feature values extracted from the three slice images. In Patent Document 3, a specific structure is detected in a 2D image by machine learning on a target region.

However, when a specific object is detected based on the feature value of image data or the like, as disclosed in Patent Documents 2 and 3, a wrong structure is detected in some cases. Further, in Patent Document 1, matching is not accurate. Specifically, for example, when a blood vessel is narrowed or blocked by a plaque, the plaque region is not recognized as a region of the blood vessel, and not extracted as a candidate point for the blood vessel in some cases. Further, when a coronary artery is extracted, if a vein runs parallel to the coronary artery, the vein may be erroneously detected as the coronary artery.

SUMMARY OF THE INVENTION

In view of the foregoing circumstances, it is an object of the present invention to provide a structure detection apparatus and method for accurately detecting a predetermined structure in image data, and a computer-readable recording medium storing a structure detection program.

A structure detection apparatus of the present invention is a structure detection apparatus for detecting a predetermined structure in image data, the apparatus comprising:

a candidate point extraction means that extracts a plurality of candidate points belonging to the predetermined structure from the image data;

a set form storage means that stores, in advance, a set form composed of a plurality of training labels, the set form representing a known form of the predetermined structure;

a representative point selection means that selects, from the plurality of candidate points extracted by the candidate point extraction means, a plurality of representative points corresponding to the plurality of training labels respectively, the plurality of representative points composing a form model that is the same as or most similar to the set form stored in the set form storage means; and a structure detection means that detects the predetermined structure in the image data by using the form model composed of the plurality of representative points selected by the representative point selection means and the plurality of candidate points.

A structure detection method of the present invention is a structure detection method for detecting a predetermined structure in image data, the method comprising the steps of:

extracting a plurality of candidate points belonging to the predetermined structure from the image data;

selecting, from the extracted plurality of candidate points, a plurality of representative points corresponding to a plurality of training labels respectively, the plurality of representative points composing a form model that is the same as or most similar to a set form that is composed of the plurality of training labels, the set form representing a known form of the predetermined structure and having been stored in advance in a set form storage means; and detecting the predetermined structure in the image data by using the form model composed of the selected plurality of representative points and the plurality of candidate points.

A computer-readable recording medium storing therein a structure detection program of the present invention stores a program for causing a computer to execute processing for detecting a predetermined structure in image data, the program comprising the procedures of:

extracting a plurality of candidate points belonging to the predetermined structure from the image data;

selecting, from the extracted plurality of candidate points, a plurality of representative points corresponding to a plurality of training labels respectively, the plurality of representative points composing a form model that is the same as or most similar to a set form that is composed of the plurality of training labels, the set form representing a known form of the predetermined structure and having been stored in advance in a set form storage means; and detecting the predetermined structure in the image data by using the form model composed of the selected plurality of representative points and the plurality of candidate points.

Here, the predetermined structure may be any object as long as a form model is formable therefrom by points and a line or lines connecting the points. Especially, the predetermined structure may include a tubular structure in a human body, such as tracheae, intestines, coronary arteries, cerebral blood vessels, pulmonary blood vessels, hepatic blood vessels, and bronchi, a human face, or the like.

Further, the image data may be medical image data obtained by imaging, for example, by a CT, MR, ultrasonic apparatus, PET-CT, SPECT, 4D-CT, OCT, X-ray radiographic apparatus (CR, DR) or the like. The image data may be 3D image data, such as volume data for example. Alternatively, the image data may be obtained by imaging by using a digital camera or the like.

The candidate points may be extracted without using a set form. For example, a region having an image characteristic (a characteristic appearing or observable in an image) of the predetermined structure may be detected in the image data, and a plurality of candidate points may be extracted from the detected region.

The set form is a known form of the predetermined structure. In other words, the set form represents a form of the predetermined structure, the form to be detected (the form that is desired or intended to be detected). For example, the set form represents a general anatomical form of the predetermined structure, or an anatomical form of the predetermined structure in a normal condition.

The set form may represent the position of each of the plurality of training labels and information about a positional relationship between the plurality of training labels. In this case, the plurality of representative points may be selected by calculating, with respect to each combination of each of the training labels and the candidate points associated with the training labels, the degrees of correspondence (agreement)) between the positions of the training labels and the positions of the candidate points associated with the training labels respectively and the degree of correspondence (degree of agreement) of a positional relationship between the training labels and a positional relationship between the candidate points associated with the training labels respectively, and by determining a combination of each of the training labels and the candidate point that has the highest degree of correspondence between the positions thereof and the highest degree of correspondence between the positional relationships.

Further, the set form may further represent information about a connection relationship between the training labels. In this case, the process of selecting representative points may determine, for each combination of each of the training labels and the candidate points, a path between two of the candidate points associated with two of the training labels that should be connected to each other in such a manner to selectively trace (follow or track) a plurality of candidate points including a candidate point or points that are not associated with the training labels in the combinations so that a cost based on a predetermined index value becomes lowest. Further, the degree of correspondence of the positional relationships may be calculated by taking the cost for the path into consideration. At this time, the predetermined structure may be detected based on the connection relationship that traces the candidate points between the representative points in the combinations determined in the process of selecting the representative points. The predetermined index value used to calculate the cost may be, for example, the position or the pixel value of each candidate point. Alternatively, the predetermined index value may be an anatomical characteristic of the predetermined structure at the candidate point. For example, when the predetermined structure is a tubular structure, the index value representing the anatomical characteristic may be the thickness of the tube (size information, such as a diameter or a radius, or the area of a cross-section), or the like.

In the process of detecting the predetermined structure, the predetermined structure may be detected by correcting a form that connects the plurality of candidate points. The form may be corrected by using the form model that connects the representative points in such a manner to form substantially the same form as the set form. Here, the plurality of candidate points may be connected, for example, by using Minimum Spanning Tree algorithm.

The process of detecting the predetermined structure should detect the predetermined structure by using a form model and a candidate region. For example, when a defect region that has been detected as the predetermined structure in the form model connecting the representative points, but in which the candidate points discontinue, is present, the defect region may be detected also as the predetermined structure. For example, in the process of extracting candidate points, even if a candidate point is not extracted from a defect region that does not have the image characteristic of the predetermined structure, the defect region may be included in the predetermined structure. Further, when an excess region in which the candidate point has been detected, but which has not been detected as the predetermined structure in the form model is present, the structure detection process excludes the excess region from the predetermined structure. For example, in the process of extracting candidate points, even if a candidate point is extracted from the excess region that has an image characteristic that is the same as or similar to the image characteristic of the predetermined structure, the excess region is excluded from the predetermined structure.

The method for selecting the representative points is not limited as long as representative points that are the same as or most similar to the set form are selected from a plurality of candidate points. For example, the representative points may be selected by selecting a set of representative points that compose a form model that is the same as or most similar to the set form by graph matching. Further, the set form may represent the form of only the predetermined structure. Alternatively, the set form may include the form of a structure different from the predetermined structure. When the set form includes the different structure, in extraction of candidate points, the candidate points may be extracted from the predetermined structure and the different structure. Further, in selection of representative points, representative points composing a form model that is the same as or most similar to the set form may be selected. Further, in detection of the predetermined structure, the predetermined structure may be detected by deleting representative points corresponding to the different structure from the plurality of representative points.

Further, the set form storage means may store an evaluation function representing the likelihood that the plurality of candidate points form the set form, the evaluation function having been learned by using training image data that have been known to represent the predetermined structure. At this time, the representative point selection process selects the representative points by using the evaluation function.

Further, when the predetermined structure is a blood vessel, the representative point selection process may select the representative points by using the thickness (size information, such as a diameter or a radius, or the area of a cross-section) of a blood vessel and a luminance at each of the candidate points together with the coordinate of each of the candidate points.

Further, the coordinates of the plurality of candidate points extracted in the candidate point extraction process may be normalized based on a predetermined reference position. At this time, the representative point selection process selects a predetermined representative point based on the normalized candidate points.

When the structure is detected, it is desirable to form the form model by connecting the selected plurality of representative points in such a manner that the form model is substantially the same as the set form.

Further, in the present invention, a region of the predetermined structure may be detected as a candidate region from the image data. Further, a plurality of candidate points may be extracted from the detected region.

Further, the candidate point extraction process may extract a plurality of (first) candidate points from a candidate region, and connect the extracted plurality of (first) candidate points to each other, and divide the extracted plurality of (first) candidate points into segments each having a predetermined length, and extract (second) candidate points from the divided segments respectively. In this case, the representative point may be selected from the (second) candidate points, and the (first) candidate points may be used to detect a structure.

When the set form includes a structure that is different from the predetermined structure, a display control means that displays structures detected by the structure detection means in such a manner that different structures are distinguishable from each other (for example, by different colors) may be further provided.

According to the structure detection apparatus and method of the present invention, and the computer-readable recording medium storing therein the structure detection program of the present invention, a plurality of candidate points belonging to the predetermined structure are extracted from the image data. Further, a plurality of representative points corresponding to a plurality of training labels respectively are selected from the extracted plurality of candidate points. The plurality of representative points compose a form model that is the same as or most similar to a set form that is composed of the plurality of training labels, the set form representing a known form of the predetermined structure and having been stored in advance in a set form storage means. Further, the predetermined structure is detected in the image data by using the form model composed of the selected plurality of representative points and the plurality of candidate points. Therefore, even if the predetermined structure is not detected only by extracting candidate points, or even if a structure other than the predetermined structure is detected, an error detection of candidate points may be corrected by using the form model. Hence, accurate detection of a structure in image data is possible.

When a structure is detected, if a defect region that has been detected as a structure in the form model connecting the representative points, but in which the candidate points discontinue, is present, the defect region may be detected as the predetermined structure. In that case, for example, even if a plaque in a blood vessel is not detected as a candidate region, it is possible to correct the defect region based on the form model, and to accurately detect a structure in image data. Specifically, even if a defect region (for example, plaque) that does not have an image characteristic of a predetermined structure (for example, a blood vessel), which is a detection target, is present, and a candidate point is not extracted from the defect region, it is possible to detect the whole predetermined structure including the defect region by interpolating a point or points in the defect region based on the form model.

When a structure is detected, if an excess region, which has been detected as a candidate region, but which has not been detected as a structure in the form model, is present, the excess region may be excluded from the predetermined structure. When the excess region is excluded in such a manner, for example, even if a vein is detected as an excess region during detection of an artery as a predetermined structure, it is possible to correct the excess region based on the form model. Hence, it is possible to accurately detect the structure in the image data. Specifically, even if a candidate point is extracted from the excess region (for example, a vein) that has an image characteristic that is the same as or similar to the image characteristic of the predetermined structure (for example, an artery), it is possible to detect only the predetermined structure by excluding the excess region based on the form model.

Further, when representative points are selected, if a set of representative points composing the form model that is the same as or most similar to the set form is selected by graph matching, it is possible to accurately select the representative points at high speed.

When a set form storage means stores an evaluation function representing the likelihood that the plurality of candidate points form the set form, the evaluation function having been learned by using training image data that have been known to represent the predetermined structure, and the representative points are selected by using the evaluation function, it is possible to accurately detect the representative points at high speed.

Further, when the representative points are selected, if the predetermined structure is a blood vessel, the representative points may be selected by using the thickness of a blood vessel and a luminance at each of the representative points together with the coordinate of each of the representative points. When the representative points are selected in such a manner, it is possible to improve the accuracy of detecting the representative points.

When the coordinates of the extracted plurality of candidate points are normalized based on a predetermined reference position, it is possible to eliminate variance in candidate points depending on individual difference of the predetermined structure. Hence, it is possible to accurately select the candidate points.

Further, when a structure is detected, if a selected plurality of representative points are connected in such a manner to be substantially the same as the set form, it is possible to accurately detect the structure.

When candidate points are extracted, if a plurality of (first) candidate points are extracted from a candidate region, and the extracted plurality of (first) candidate points are connected to each other, and the extracted plurality of (provisional) candidate points are divided into segments each having a predetermined length, and the candidate points are extracted from the divided segments, it is possible to reduce a data amount and to efficiently detect a structure at high speed.

Note that the program may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 11 is flow chart illustrating a preferred embodiment of a structure detection method according to the present invention;

FIG. 12A is a schematic diagram illustrating an example of determining an optimum path between candidate points associated with training labels; and FIG. 12B is a schematic diagram illustrating an example of interpolating a point in a defect region by determining the optimum path between the candidate points associated with training labels.

DESCRIPTION OF THE PREFERRED EMBODIMENTS

Figure 1:
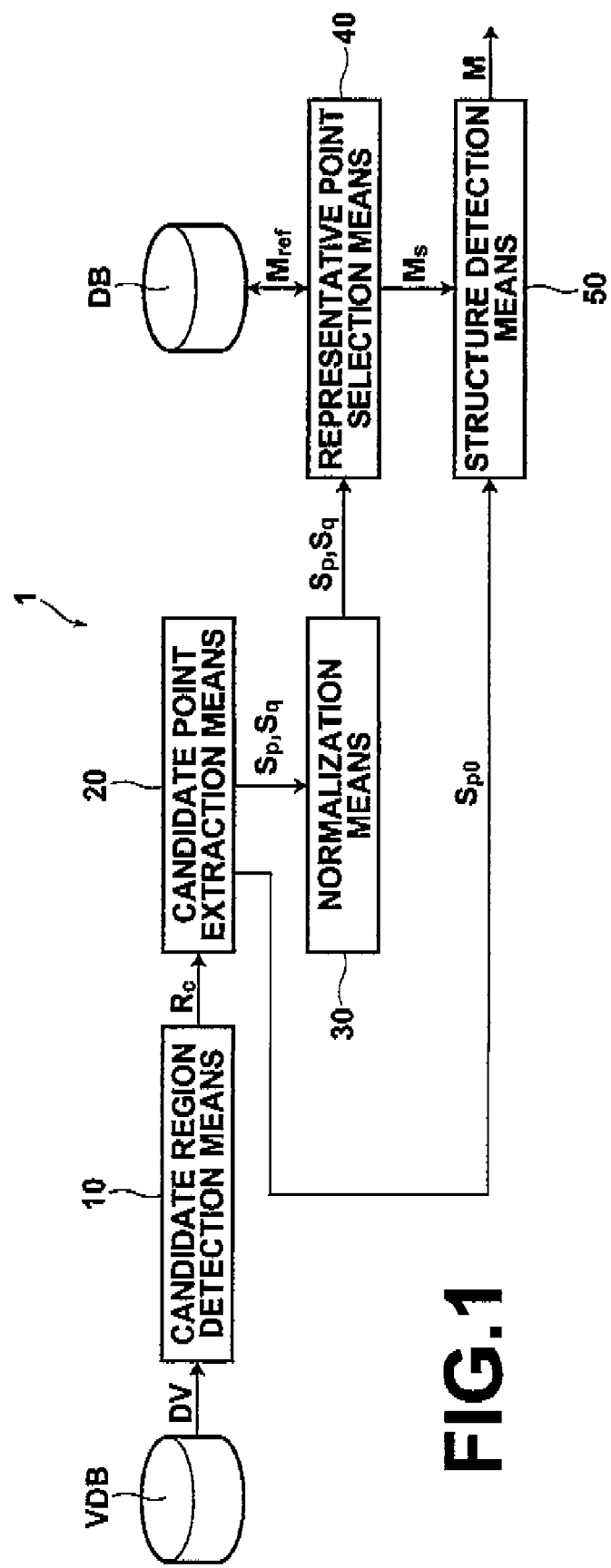
FIG. 1 is a block diagram illustrating a preferred embodiment of a structure detection apparatus according to the present invention.

Hereinafter, an embodiment of a medical image display apparatus according to the present invention will be described in detail with reference to drawings. FIG. 1 is a schematic diagram illustrating a structure detection apparatus 1 according to the first embodiment of the present invention. The configuration of the structure detection apparatus 1, as illustrated in FIG. 1, is realized by executing, in a computer, a structure detecting program that has been read in an auxiliary storage apparatus. At this time, the structure detection program is recorded in a storage medium, such as a CD-ROM, or the structure detection program recorded in a storage of a server is distributed through a network, such as the Internet, and installed in a computer. The structure detection apparatus 1, illustrated in FIG. 1, detects structure M, such as a coronary artery for example, in image data. The structure detection apparatus 1 includes a candidate region detection means 10, a candidate point extraction means 20, a normalization means 30, a representative point selection means 40, and a structure detection means 50.

The candidate region detection means 10 detects candidate region $R_c$ by judging whether the region constitutes a part of predetermined structure M in image data. Image data DV may be 3D volume data generated from a 2D image or a plurality of 2D images that are obtained by imaging, for example, by an imaging apparatus (photography apparatus) or a radiation detection apparatus. The image data DV are stored in data storage means VDB.

Figure 2:
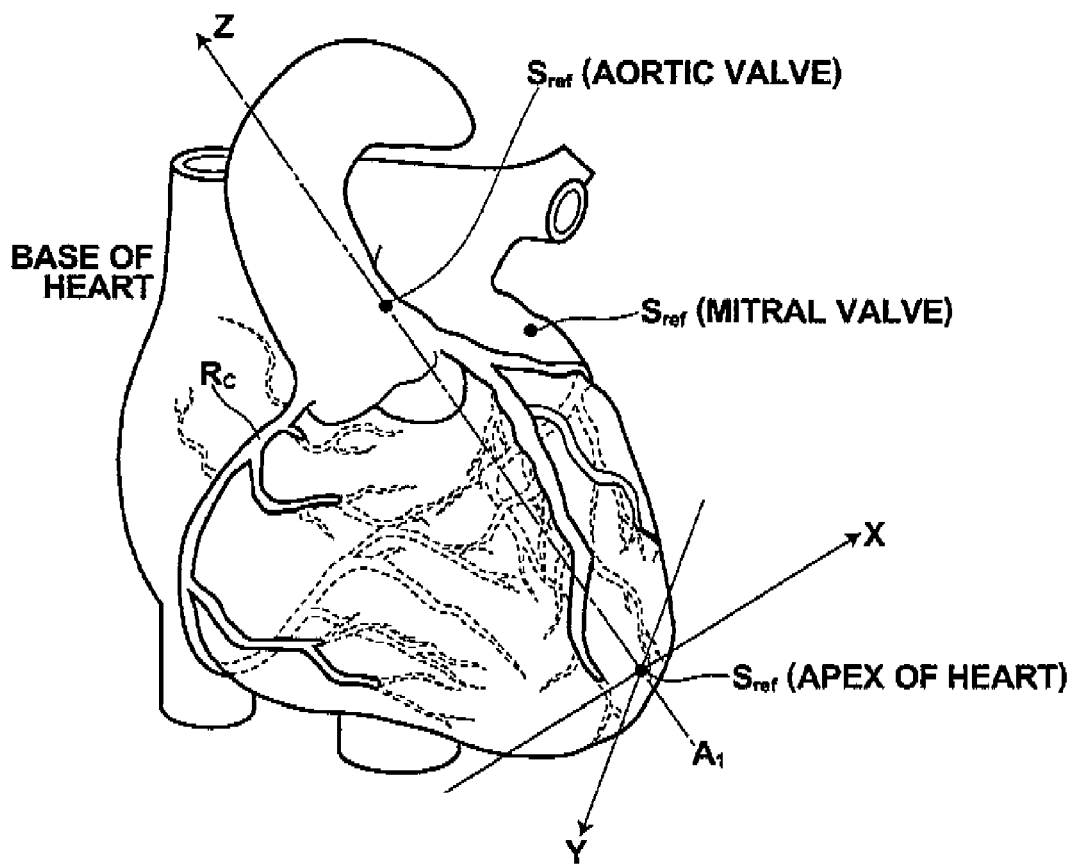
FIG. 2 is a schematic diagram illustrating an example of a coronary artery detected, as a specific structure, by a candidate region detection means illustrated in FIG. 1.

The candidate region detection means 10 detects the candidate region by using a technique disclosed, for example, in Japanese Patent Application No. 2009-048679 and Japanese Patent Application No. 2009-069895 or other known techniques. Detection of candidate region $R_c$ in volume data when predetermined structure M is a coronary artery of the heart, as illustrated in FIG. 2, will be described, as an example.

First, the candidate region detection means 10 calculates, based on the values of voxel data composing the volume data DV, the positions of a plurality of candidate points composing a core line of the coronary artery and a main axis direction. Alternatively, the candidate region detection means 10 may calculate a Hessian matrix with respect to the volume data DV, and analyze a unique value of the calculated Hessian matrix to calculate position data about the plurality of candidate points composing the core line of the coronary artery and the main axis direction. Further, the candidate region detection means 10 calculates a feature value representing the degree (likelihood) of having a characteristic of a coronary artery with respect to voxel data in the vicinity of the candidate point. Further, the candidate region detection means 10 judges, based on the calculated feature value, whether the voxel data represent a region of a coronary artery. The judgment based on the feature value is performed, for example, based on an evaluation function that has been obtained in advance by machine learning. Accordingly, image data DV that have been judged as a region of the coronary artery are extracted, as the candidate region $R_c$, from the image data.

Figure 3:
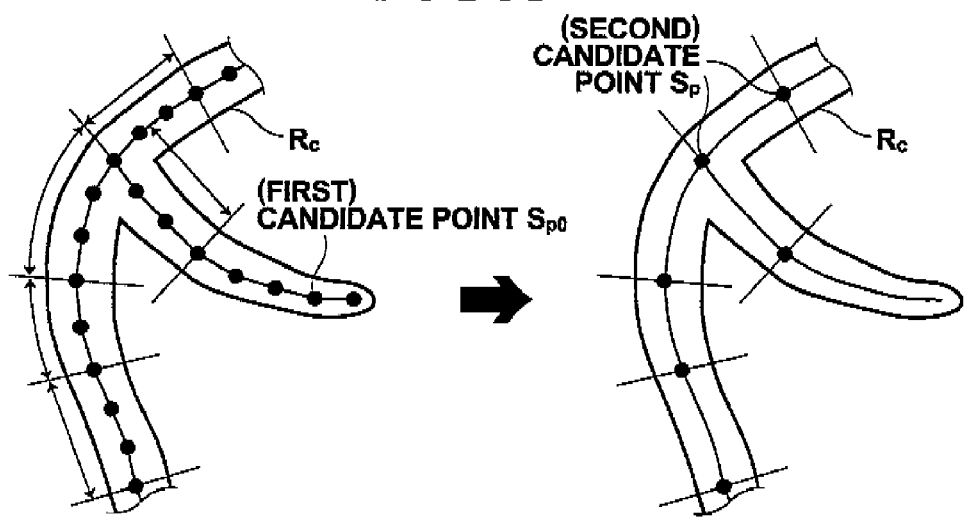
FIG. 3 is a schematic diagram illustrating a manner of extracting a candidate point from a candidate region by a candidate point extraction means illustrated in FIG. 1.

The candidate point extraction means 20, illustrated in FIG. 1, extracts a plurality of candidate points $S_p$ (p=1 through n: n is the number of extracted candidate points) from the candidate region $R_c$ detected by the candidate region detection means 10. FIG. 3 is a schematic diagram illustrating a manner of extracting candidate points $S_p$ from the candidate region $R_c$. In FIG. 3, the candidate point extraction means 20 extracts a plurality of (first) candidate points $S_{p0}$ from the candidate region $R_c$, and connects the extracted plurality of (first) candidate points $S_{p0}$. If Minimum Spanning Tree algorithm is used as the method for connecting the (first) candidate points $S_{p0}$, it is possible to connect all of the (first) candidate points $S_{p0}$ at the minimum cost. As the cost, a distance between the (first) candidate points $S_{p0}$, or the like may be used. When the distance between the (first) candidate points $S_{p0}$ is used as the cost, it may be defined that the cost is higher as the distance is longer. Further, the candidate point extraction means 20 divides the plurality of (first) candidate points $S_{p0}$ into segments, each having a predetermined unit of length (segmentation). Further, the candidate point extraction means 20 selects division points, at which the plurality of (first) candidate points $S_{p0}$ were divided, as (second) candidate points $S_p$. Further, the candidate point extraction means 20 assigns labels $S_p$ to respective (second) candidate points. In the example illustrated in FIG. 3, the candidate point extraction means 20 sets the (second) candidate points $S_p$ based on the set (first) candidate points $S_{p0}$. Alternatively, form model $M_s$, which will be described later, may be detected by using the (first) candidate point $S_{p0}$. At this time, the candidate region detection means 10 functions as the candidate point extraction means 20.

The normalization means 30 illustrated in FIG. 1 normalizes, based on predetermined reference position $S_{ref}$, the coordinates of the plurality of (second) candidate points $S_p$ extracted by the candidate point extraction means 20. For example, when a predetermined structure is a coronary artery, the normalization means 30 detects an aortic valve, a mitral valve, and the apex of the heart, illustrated in FIG. 2, and sets them as reference positions $S_{ref}$. The normalized position of each (second) candidate point $S_p$ is represented in a new coordinate system, in which the apex of the heart is the origin. Further, in the new coordinate system, an axis directing from the apex of the heart to the aortic valve is Z axis, the exterior product of a vector directing from the apex of heart to the mitral valve and the Z axis is X axis, and the exterior product of the X axis and the Z axis is Y axis. Further, in the new coordinate system, the length from the apex of the heart to the aortic valve is 1. Variance in the aortic valve, the mitral valve, and the apex of the heart by individual difference is small. Therefore, when normalization is performed by using the reference positions $S_{ref}$, it is possible to suppress variance in (second) candidate points $S_p$ caused by the individual difference of patients or the like.

Figure 4:
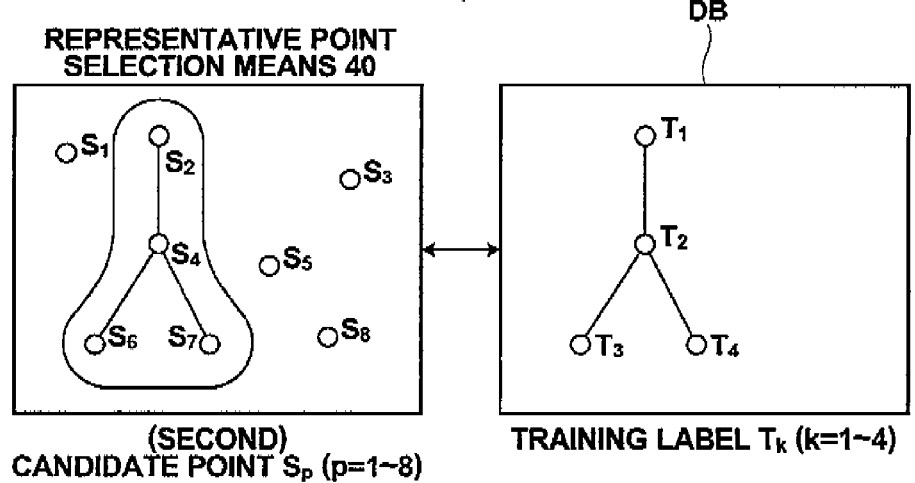
FIG. 4 is a schematic diagram illustrating a manner of selecting a predetermined representative point in a representative point selection means illustrated in FIG. 1.

The representative point selection means 40, illustrated in FIG. 1, selects representative points that compose form model $M_s$ that is the same as or most similar to set form $M_{ref}$ stored in set form storage means DB. The representative point selection means 40 selects the representative points from the plurality of (second) candidate points $S_p$ normalized by the normalization means 30. Further, the representative point selection means 40 forms the form model $M_s$ by connecting the selected plurality of representative points in such a manner that the selected plurality of representative points are substantially the same as the set form $M_{ref}$. For example, as illustrated in FIG. 4, when the candidate point extraction means 20 extracts a plurality of (second) candidate points $S_p$ (p=1 through 8), and the set form storage means DB stores set form $M_{ref}$ that is composed of four training labels $T_k$ (k=1 through 4), the representative point selection means 40 selects representative points ($T_1$ is $S_2$, $T_2$ is $S_4$, $T_3$ is $S_6$, and $T_4$ is $S_7$) that are the same as or most similar to the set form $M_{ref}$ to form the form mode $M_s$.

Here, the representative point selection means 40 selects the plurality of representative points $S_p$ by graph matching. The set form storage means DB stores, as set form $M_{ref}$, energy function L in graph matching. The energy function L is composed of a unary term of $S_p$, and a pairwise term of $S_p$ and $S_q$, represented by the following formula (1). A (second) candidate point $S_p$ (node) that maximizes the value of the formula (1) is the representative point that forms the form model $M_s$.

[Formula 1]

$$\max L = \sum_{Sp \in v} \theta_{Sp}(X_{Sp}) + \sum_{(Sp,Sq) \in \varepsilon} \theta_{Sp,Sq}(X_{Sp}, X_{Sq}).  \quad (1)$$

In Formula (1), v represents a set of candidate points, and $X_{sp}$ represents training label $T_k$ of set form $M_{ref}$ taken by (second) candidate point $S_p$. $\theta_{Sp}(X_{Sp})$ gives energy when the (second) candidate point $S_p$ takes training label $T_k$. $\varepsilon$ represents a set of combination of candidate points. Here, a combination defined by the set form $M_{ref}$ is considered. $\theta_{SpSq}(X_{Sp}, X_{Sq})$ gives energy when the (second) candidate points $S_p$, $S_q$ take training labels $T_k$, $T_m$. As described above, these kinds of energy represent the degrees of correspondence between the (second) candidate point $S_p$ and the set form $M_{ref}$. The representative point is selected by searching the plurality of (second) candidate points $S_p$ for a combination of (second) candidate points $S_p$ that forms form model $M_s$ that is most similar to the set form $M_{ref}$.

To maximize the value of the formula (1), a known technique, which is typified by Loopy Belief Propagation or the like, may be used. The Loopy Belief Propagation is described, for example, in K. P. Murphy et al., "Loopy Belief Propagation for Approximate Inference: An Empirical Study", Uncertainty in Artificial Intelligence, pp. 467-475, 1999. Alternatively, a method that guarantees the convergence of the Loopy Belief Propagation, and which is disclosed in V. Kolmogorov, "Convergent Tree-Reweighted Message Passing for Energy Minimization", in PAMI, pp. 1568-1583, 2006, or a method disclosed in L. Torresani et al., "Feature Correspondence Via Graph Matching: Models and Global Optimization", in ECCV Part II, pp. 596-609, 2008 may be adopted.

Next, the unary term and the pairwise term in the formula (1) will be further described. First, $\theta_{Sp}(X_{Sp})$ in the unary term of the formula (1) may be represented by the following formula (2):

[Formula 2]

$$\theta_{Sp}(X_{Sp}) = \frac{1}{\sqrt{2\pi\sigma^2}^3} \exp(-\|P_{Sp} - \mu_{X_{Sp}}\|^2 / 2\sigma^2_{X_{Sp}}) - C. \quad (2)$$

Here, $P_{Sp}$ is the coordinate of (second) candidate point $S_p$. Further, $\mu_{XSp}$ and $\sigma_{XSp}^2$ are the average coordinate and the variance in training labels $T_k(=X_{Sp})$, respectively, obtained from a plurality of sets of training data that are known to represent the predetermined structure M.

Figure 5A:
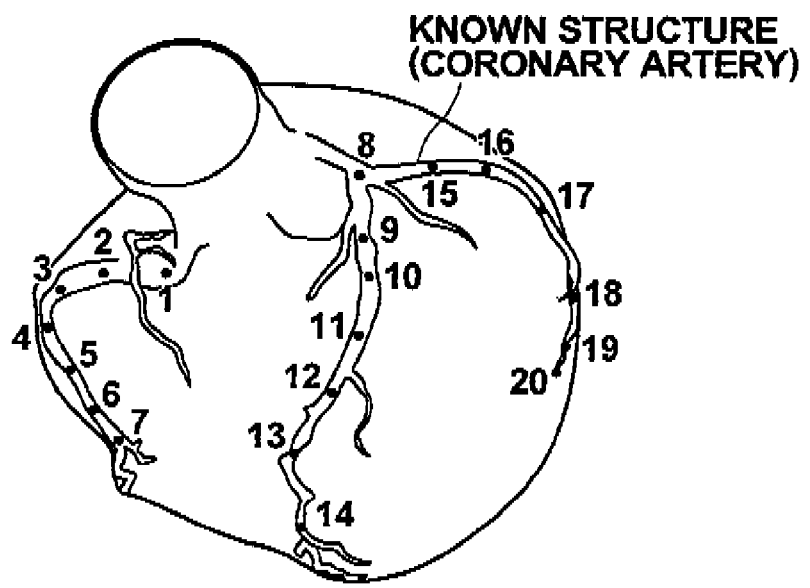
FIG. 5A is a schematic diagram illustrating an example of training data when a set model is learned by a set form storage means illustrated in FIG. 1.
Figure 5B:
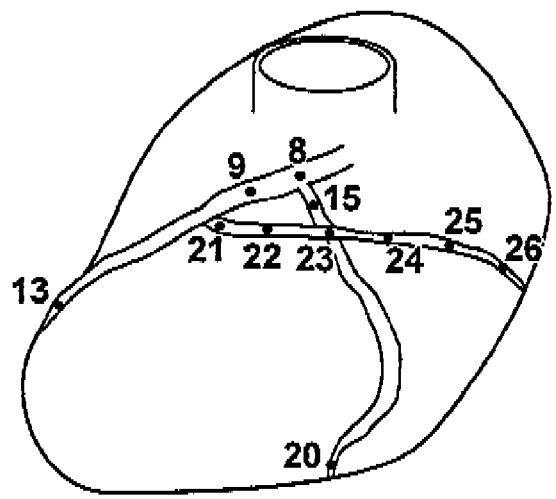
FIG. 5B is a schematic diagram illustrating another example of training data when a set model is learned by the set form storage means, illustrated in FIG. 1.
Figure 6:
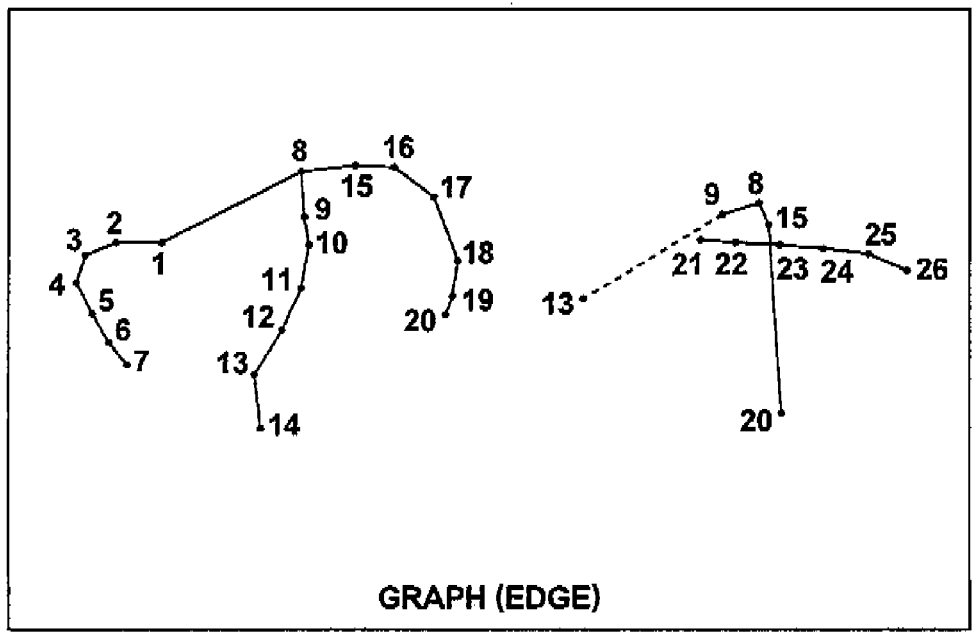
FIG. 6 is a schematic diagram illustrating an example of a graph (edge) connecting representative points (training labels)

Specifically, a plurality of training labels $T_k$ (for example, k=1 through 26) are extracted from training data that have been known to be a predetermined structure M, as illustrated in FIGS. 5A and 5B. In FIGS. 5A and 5B, the training labels $T_1$ through $T_{20}$ have been extracted from coronary artery, which is the predetermined structure M. The training labels $T_{21}$ through $T_{26}$ have been extracted from coronary vein. As illustrated in FIG. 6, set form (graph) $M_{ref}$ is formed by connecting predetermined labels of the training labels $T_1$ through $T_{26}$ by edges (lines). Here, this model represents only the main coronary artery and coronary vein. Alternatively, branching to thinner coronary artery may be included in the model.

Extraction of the training label $T_k$ is performed on each of a plurality of sets of training data. Further, the average coordinate $\mu_{Tk}$ and the variance $\sigma_{Tk}^2$ are calculated for the training label $T_k$ of each set of training data. Further, the probability density function $\theta_{Sp}(X_{Sp})$, represented by the formula (2), is obtained. In the formula (2), C is a constant term that prevents assignment of an unnecessary label by making the energy obtained by calculation negative when the probability is extremely low.

In the formula (2), the value of $\theta_{Sp}(X_{Sp})$ becomes smaller, as the distance between the coordinate of the (second) candidate point $S_p$ and the coordinate of the training label $T_k$ is longer. In contrast, the value of $\theta_{Sp}(X_{Sp})$ becomes larger, as the distance between the coordinate of the (second) candidate point $S_p$ and the coordinate of the training label $T_k$ is shorter. Therefore, a combination of (second) candidate points $S_p$ that maximizes the total value of the probability density function $\theta_{Sp}(X_{Sp})$ of each training label $T_k$ represented in Formula (1) is a combination of representative points composing the form model $M_s$ that is most similar to the set form $M_{ref}$.

The probability density of the (second) candidate point $S_p$ represented by the formula (2) is used as an example. Alternatively, other known functions, such as a parametric function and a non-parametric function, may be used.

Figure 7:
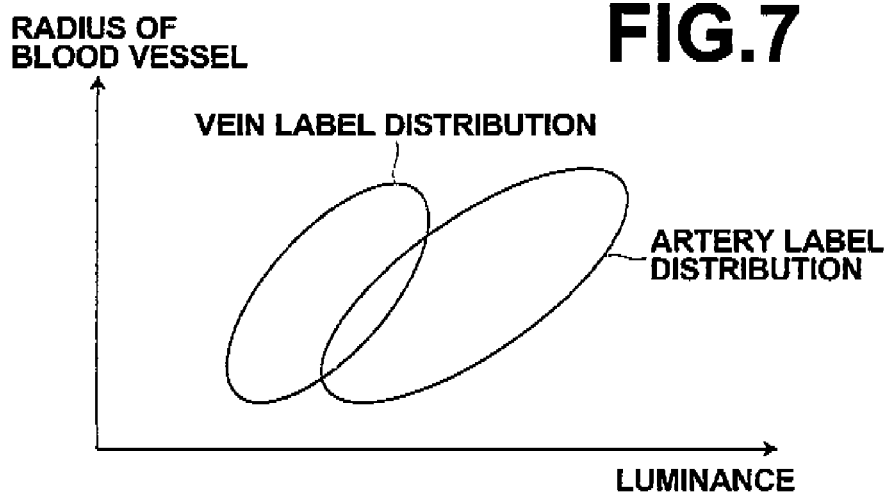
FIG. 7 is a graph illustrating a manner of selecting representative points by the representative point selection means, illustrated in FIG. 1, by using luminance values and the radii of blood vessels.

In the formula (2), the degree of correspondence between the (second) candidate point $S_p$ and the set form $M_{ref}$ is calculated based on the coordinates. The probability with respect to the luminance and the radius of the blood vessel may be learned also from training data, and a unary term may be generated in combination with the probability density function $\theta_{Sp}(X_{Sp})$, represented by the formula (2). For example, in a contrast CT image for analyzing coronary arteries, the radius of an artery may be the same as the radius of a vein, but the luminance of the vein is lower than the luminance of the artery. Therefore, the luminance and the radius of the blood vessel has a relationship as illustrated in FIG. 7. The probability that the (second) candidate point $S_p$ is an artery or a vein based on the relationship illustrated in FIG. 7 may be added to the formula (2).

Figure 8:
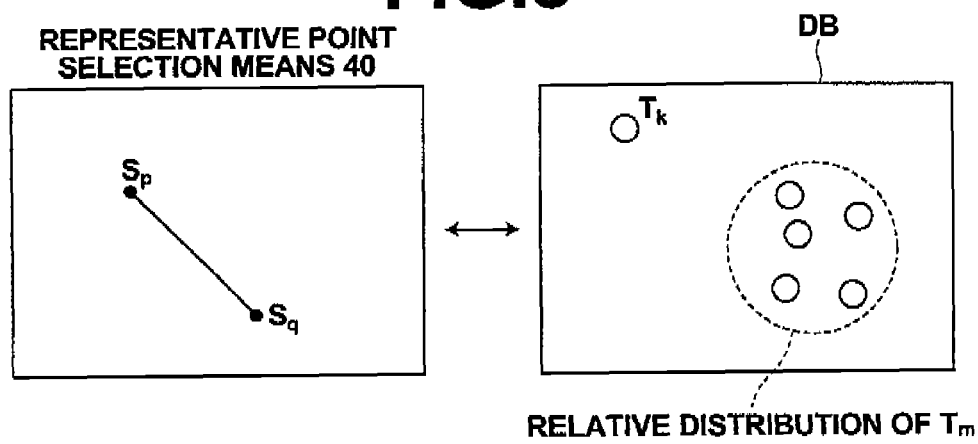
FIG. 8 is a schematic diagram illustrating a manner of selecting a representative point by the representative point selection means, illustrated in FIG. 1.

In the formula (1), the pairwise term includes probability density function $\theta_{SpSq}(X_{Sp}, X_{Sq})$ about a relative coordinate representing a positional relationship of a certain (second) candidate point $S_p$ with respect to another (second) candidate point $S_q$, as illustrated in FIG. 8. Here, in a manner similar to the formula (2), an average of distances of relative coordinates between the training label $T_k$ and other labels $T_m$, the variance in the labels or the like have been obtained in advance by using a plurality of sets of training data that are known to be the predetermined structure M.

As illustrated in FIG. 6, the label $T_m$ with respect the training label $T_k$ is set in advance in the set form $M_{ref}$, for example, as an adjacent training label, a training label in a continuing blood vessel, or the like. Further, the pairwise term is set so that the set of representative points most similar to the set form has the largest value. Further, the representative point selection means 40 calculates the pairwise term for the combination of (second) candidate points $S_p$, $S_q$ connected by the edge. In the formula (1), the energy function L was maximized. Alternatively, the unary term and the pairwise term may be multiplied by a negative value to lower the evaluation value of the energy function L.

Further, the pairwise term may be formed in a manner similar to the unary term. Specifically, not only the probability density is calculated based on the coordinate, the probabilities with respect to the luminance and the radius of the blood vessel may be learned from the training data, and the pairwise term may be formed in combination with the probability density function. Consequently, the feature that the luminance and the radius of the blood vessel do not change sharply between adjacent labels in the same blood vessel is reflected in the energy function L.

Therefore, the representative point selection means 40 can select a set of representative points forming the form model $M_s$ that is most similar to the set form from the plurality of (second) candidate points $S_p$ by obtaining a solution to the formula (1) by Loopy Belief Propagation, or the like (please refer to FIG. 4). Further, various features may be provided as the energy function L of the formula (1) based on the kind of the structure M. The energy function L was described by using a case in which representative points are statistically searched for based on the training data. Alternatively, a parameter that is experimentally designed by a person may be used in combination.

The structure detection means 50, illustrated in FIG. 1, detects structure M from image data DV by using form model $M_s$ that is formed by representative points selected by the representative point selection means 40 and (first) candidate points $S_{p0}$. Specifically, the (first) candidate points $S_{p0}$ (nodes) extracted from the image data DV by the candidate point extraction means 20 are connected by lines (edges), and a coronary artery in the image data DV is extracted as a graph (tree structure). Here, Spanning Tree Algorithm for generating Minimum Spanning Tree or Shortest Path Tree may be used for connecting. Meanwhile, the form of a graph that should be detected as a coronary artery and the connection relation between representative points are extracted as the form model $M_s$ based on the representative points selected by the representative point selection means 40. The structure detection means 50 detects the structure M based on the form model $M_s$ and the (first) candidate points $S_{p0}$.

Figure 9:
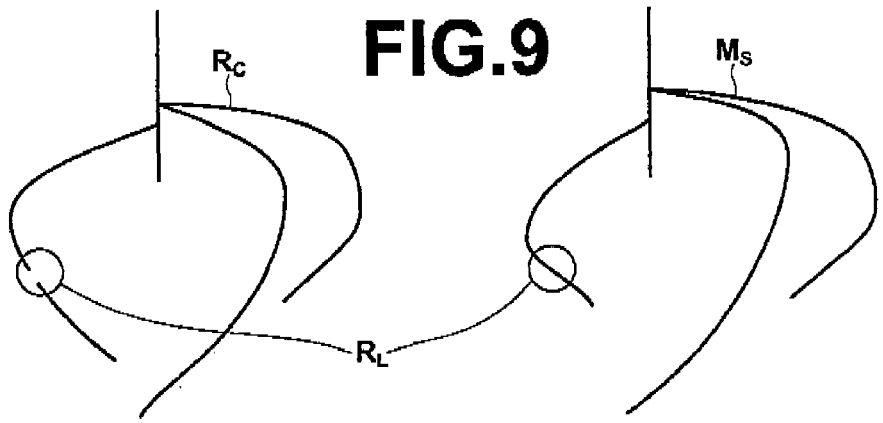
FIG. 9 is a schematic diagram illustrating a manner of correcting a candidate region, based on a form model, by a structure detection means, illustrated in FIG. 1.

Specifically, when defect region $R_L$ that is structure M in the form model $M_s$, but in which (first) candidate point $S_{p0}$ is not detected, is present, the structure detection means 50 detects the defect region $R_L$ as the structure M by correcting. For example, a new (first) candidate point $S_{p0}$ is added to the (first) candidate points $S_{p0}$ or a connection between the (first) candidate points $S_{p0}$ is added, or the like. For example, as illustrated in FIG. 9, when a plaque is present in the coronary artery, in extraction of the candidate region $R_c$, the plaque region $R_L$ is not extracted as the candidate region $R_c$ of the coronary artery. The (first) candidate points $S_{p0}$ (candidate region $R_c$) discontinue in the defect region $R_L$. Therefore, a part of a blood vessel before the plaque and the remaining part of the same blood vessel, which is after the plaque, are not detected as continuing parts of the same blood vessel. However, in the form model $M_s$, when the representative points are connected by a line in the discontinued part, the part before the plaque and the part after the plaque are identified as a continuing coronary artery in spite of the plaque. Therefore, the structure detection means 50 corrects the detection result of the (first) candidate points $S_{p0}$ (candidate region $R_c$), and detects the plaque region $R_L$ also as a region of the coronary artery.

Further, when an excess region which has been detected as the (first) candidate point $S_{p0}$ (candidate region $R_c$), but which has not been detected as the structure in the form model, is present, the structure detection means 50 excludes the excess region from the structure. For example, when an excess region that is formed by a cardiac muscle in contact with the coronary artery is present, the cardiac muscle is extracted as the candidate region $R_c$ in extraction of the candidate region $R_c$. However, the excess region formed by the cardiac muscle is not detected as a region of the coronary artery in the form model $M_s$. Therefore, the structure detection means 50 corrects the detection result of the candidate region $R_c$, and deletes the excess region formed by the cardiac muscle.

Figure 10:
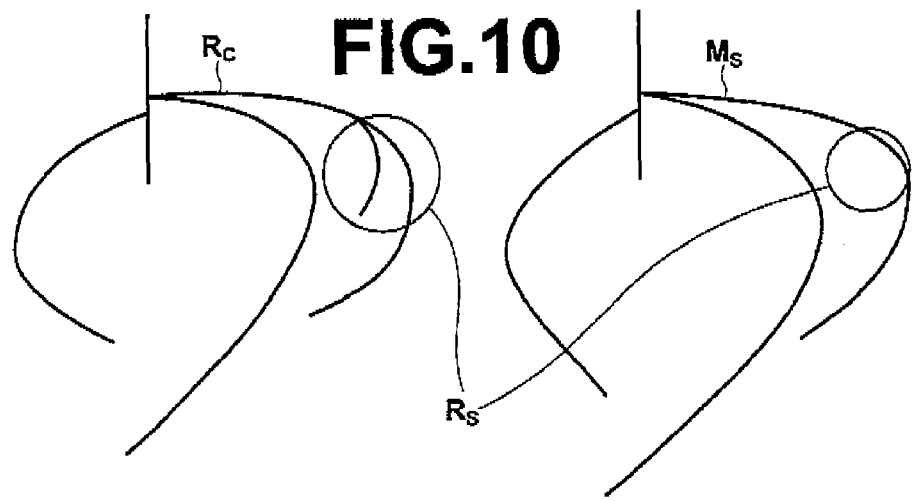
FIG. 10 is a schematic diagram illustrating a manner of correcting a candidate region, based on a form model, by the structure detection means, illustrated in FIG. 1.

Further, when a vein region $R_s$ (for example, $T_{21}$ through $T_{26}$ in FIG. 5B), as another structure that is defined in the set form $M_{ref}$ in a manner similar to the artery (for example, $T_1$ through $T_{20}$ in FIG. 5A) as the predetermined structure M, is present, the excess region $R_s$ is excluded from the structure. For example, as illustrated in FIG. 10, when an excess region $R_s$ that is formed by a coronary vein in contact with the coronary artery is present, the excess region $R_s$ is extracted as the candidate region $R_c$, but identified as a vein in the form model $M_s$. Therefore, the structure detection means 50 corrects the detection result of the candidate region $R_c$, and deletes the vein region $R_s$.

When the different structures (an artery and a vein), as described above, are the set form $M_{ref}$, a structure other than the predetermined structure is detected in addition to the predetermined structure. This may be utilized, and a display control means may be further provided to display different structures with different colors respectively. Further, the structure detection means 50 may detect the structure M not only by adding the defect region $R_L$ or deleting the excess region $R_s$, as described above, but also by correcting (changing) the position or range of the candidate region $R_c$ based on the form model $M_s$.

As described above, the structure M is detected by using both of the candidate region $R_c$ and the form model $M_s$. Therefore, accurate detection is possible. Specifically, when only the candidate region $R_c$ is extracted to detect the structure M, an error extraction may occur in some cases. For example, a region in which the plaque is present in FIG. 9 may not be detected, or the coronary vein illustrated in FIG. 10 may be detected also as the coronary artery, or the like. In contrast, when a structure is detected not only by detecting candidate region $R_c$ but also by comparing with a form mode searched by matching (graph matching) based on (second) candidate points $S_p$, detection of the form model by matching can compensate or prevent occurrence of error detection based on (first) candidate points $S_{p0}$. Hence, it is possible to accurately detect the structure. In other words, accurate detection is possible by detecting the structure M not only based on the feature value of the image data DV but also by using the form model $M_s$ identifying the anatomical structure of the structure M.

FIG. 11 is a flow chart illustrating a preferred embodiment of a structure detection method of the present invention. The structure detection method will be described with reference to FIG. 1 through 11. First, the candidate region detection means 10 detects candidate region $R_c$ in image data DV (step ST1, please refer to FIG. 2). The candidate point extraction means 20 extracts a plurality of (first) candidate points $S_{p0}$ from the candidate region $R_c$, and the (second) candidate point $S_p$ is extracted by segmentation (step ST2, please refer to FIG. 3). After the normalization means 30 performs normalization, the representative point selection means 40 selects a set of representative points forming form model $M_s$ that is most similar to the set form $M_{ref}$ from the plurality of candidate points $S_p$ by using the formula (1) (step ST3, please refer to FIG. 4). Further, the structure detection means 50 compares the candidate region $R_c$ with the form model $M_s$, and performs correction by adding a region forming the structure M or by deleting a region. Accordingly, the structure M is detected in the image data (step ST4, please refer to FIGS. 9 and 10).

According to the first embodiment of the present invention, a plurality of candidate points are extracted from predetermined structure M in image data DV. Further, representative points composing form model $M_s$ that is the same as or most similar to the set form $M_{ref}$ representing the form of a predetermined structure, the set form $M_{ref}$ being stored in advance in the set form storage means DB, are selected from the extracted plurality of candidate points. Further, the structure M is detected in the image data DV by using the form model $M_s$ formed by the selected plurality of representative points and the candidate region $R_c$. Accordingly, even if the predetermined structure M is not detected in detection of the candidate region $R_c$, or even if a structure other than the predetermined structure M is detected in detection of the candidate region $R_c$, it is possible to correct the error detection of the candidate points by using the form model $M_s$. Hence, the structure M is accurately detected in the image data DV.

Further, as illustrated in FIG. 9, when defect region $R_L$ that is not detected as the candidate region $R_c$ but detected as a structure in form model $M_s$ connecting representative points, and in which the candidate points discontinue, is present, the structure detection means 50 may detect the defect region $R_L$ as the structure M. When the defect region $R_L$ is detected in such a manner, for example, even if the candidate points discontinue by a plaque in a blood vessel, it is possible to correct the defect region $R_L$ based on the form model $M_s$. Hence, accurate detection of the structure M in the image data DV is possible.

Further, when excess region $R_s$ that is detected as a candidate point but that is not detected as the structure M in the form model $M_s$ is present, the structure detection means 50 may exclude the excess region $R_s$ from the structure M. When the excess region $R_s$ is excluded in such a manner, for example, if a vein is detected as the excess region $R_s$ in detection of the artery as the predetermined structure M, it is possible to correct the excess region $R_s$ based on the form model $M_s$. Hence, accurate detection of the structure M in the image data DV is possible.

Further, when the representative point selection means 40 selects a set of representative points forming the form model $M_s$ that is the same as or most similar to the set form by graph matching, it is possible to accurately detect the representative points at high speed.

Further, as represented by formula (1), the set form storage means DB may store evaluation function L representing a likelihood that the plurality of candidate points form the set form $M_{ref}$, the evaluation function having been learned by using training image data that have been known to represent the predetermined structure M. Further, when the representative point selection means 40 selects the representative points by using the evaluation function, it is possible to accurately select the representative points at high speed.

Further, as illustrated in FIG. 7, when the predetermined structure is a blood vessel, the representative point selection means 40 may select the representative points by using the radius of the blood vessel and the luminance at the candidate point together with the coordinate of the candidate point. When the representative points are selected in such a manner, it is possible to improve the accuracy of detecting the representative points.

Further, the normalization means 30 that normalizes, based on the predetermined reference position $R_{ref}$, the coordinates of the plurality of candidate points extracted by the candidate point extraction means 20 may be provided. When the normalization means 30 is provided, it is possible to eliminate the variance in the representative points caused by the individual difference of the predetermined structure M. Hence, accurate detection of the representative points is possible.

Further, when the structure detection means 50 connects the selected plurality of representative points in such a manner to be substantially the same as the set form $M_{ref}$, it is possible to accurately detect the structure M. To connect the representative points in such a manner to become substantially the same as the set form $M_{ref}$, closest points of adjacent representative points of the selected representative points may be simply connected to each other.

Further, as illustrated in FIG. 3, the candidate region detection means 10 may be further provided. The candidate region detection means 10 detects a region of the predetermined structure as the candidate region $R_c$ in the image data. Further, the candidate point extraction means 20 may extract a plurality of (first) candidate points $S_{p0}$ from the candidate region $R_c$, and connect the extracted plurality of (first) candidate points $S_{p0}$ to each other, and divide the extracted plurality of (first) candidate points $S_{p0}$ into segments each having a predetermined length, and extract the (second) candidate points $S_p$ from the divided segments respectively. Hence, it is possible to reduce the data amount and to efficiently detect the structure at high speed.

In a modification example of the above embodiment, the structure detection means 50 may detect the structure M by connecting adjacent representative points smoothly through other candidate point or points. Such connection may be realized by solving a shortest path problem by using adjacent representative points (two representative points directly connected to each other) as a start point and an end point. Specifically, Dijkstra method or the like may be used.

For example, when the candidate points are connected to each other based on conventional Minimum Spanning Tree algorithm or the like, the structure M is detected in such a manner that all of the candidate points are traced. In this case, no candidate point is present in the defect region $R_L$. Therefore, the cost value calculated by the Minimum Spanning Tree algorithm is too large. Hence, it is judged that connection is impossible, and the connection between the candidate points is broken. Further, a candidate point in the vicinity of the defect region $R_L$, which should not be connected originally, is connected through a non-shortest way (or by bypassing the defect region $R_L$). Further, the candidate point in the excess region $R_s$, which should not be connected originally, is excessively connected. Therefore, the structure detection means 50 should use the representative points that have been determined by the representative point selection means 40, and the connection relationship of which has been known. Further, the structure detection means 50 should connect, through another candidate point or other candidate points between the representative points, the representative points. When the representative points are connected in such a manner, it is not necessary to use the Minimum Spanning Tree algorithm that operates in such a manner to connect all of the candidate points. It is possible to appropriately connect the representative points based on the minimum path search algorithm.

Next, the second embodiment of the present invention will be described. The configuration of the structure detection apparatus according to the second embodiment of the present invention and the flow chart of the structure detection method according to the second embodiment of the present invention are similar to those of the first embodiment (please refer to FIGS. 1 and 11).

In the second embodiment, the candidate point extraction means 20 does not connect the candidate points. The candidate point extraction means 20 extracts the candidate points $S_p$ as a group of candidate points that do not have connection relationships. For example, the candidate point extraction means 20 sets a plurality of points at predetermined intervals in candidate region $R_c$ detected by the candidate region detection means 10, and assign labels $S_p$ (p=1 through n: n is the number of extracted candidate points). Accordingly, the candidate points $S_p$ are extracted. Further, the extracted candidate points $S_p$ are normalized by the normalization means 30 in a manner similar to the first embodiment.

Next, the representative point selection means 40 selects a representative point that maximizes the energy represented by the formula (1) from the candidate points $S_p$ extracted by the candidate point extraction means 20 in a manner similar to the first embodiment.

Here, the unary term in the formula (1) represents, for each label (point), the degree of correspondence of attributes (coordinates, luminance, radius of a blood vessel, or the like) between each training label and candidate point $S_p$ associated with the training label in a manner similar to the first embodiment.

Further, the pairwise term in the formula (1) may be represented by the following formula (3):

[Formula 3]

$$\theta_{SpSq}(X_{Sp}, X_{Sq}) = e\_global_{SpSq}(X_{Sp}, X_{Sq}) + \max\left(\sum_{(Si,Sj)\in Path(Sp,Sq)} e\_local(S_i, S_j)\right). \quad (3)$$

Here, e_global, which is the first term on the right side of the formula (3), represents the degree of correspondence between the relative relationship of the attributes of the training labels $T_k$, $T_m$ (such as relative coordinates, or variation (difference) in luminance or the radius of the blood vessel) and the relative relationship of the attributes of the candidate points $S_p$, $S_q$ associated with the training labels $T_k$, $T_m$ in a manner similar to the first embodiment.

Meanwhile, max(Σe_local), which is the second term on the right side of the formula (3), is newly added in the second embodiment, and relates to the degree of desirability (appropriateness) of the path between the candidate points $S_p$ and $S_q$. Specifically, in the formula (3), e_local represents the degree of desirability of connection between two other candidate points $S_i$ and $S_j$ that are directly connected to each other when the candidate points $S_p$ and $S_q$ are connected by tracing the other candidate points between the candidate points $S_p$ and $S_q$ that are associated with the training labels. The degree of desirability of the connection may be defined, for example, in such a manner that the value becomes larger as the distance between the two points $S_i$ and $S_j$ is closer, or as the difference in the luminance values is smaller, or as the difference in the thicknesses of the blood vessels is smaller. In the formula (3), Σe_local is the total value of e_local for all pairs of candidate points directly connected to each other on the path between, the candidate points $S_p$ and $S_q$. The value of Σe_local represents the degree of desirability of the whole path between the candidate points $S_p$ and $S_q$. Further, in the formula (3), max(Σe_local) is the maximum value of Σe_local among the paths connecting various candidate points between the candidate points $S_p$ and $S_q$. Further, max(Σe_local) represents the value of desirability of the whole path when the path is most desirable among the paths connecting various candidate points.

The representative point selection means 40 uses each candidate point, for example, as a graph structure in which a side (edge) connecting the candidate points (nodes) is weighted by using the weight defined by e_local in the formula (3). Further, the representative point selection means 40 may obtain the value of max(Σe_local) by calculating the optimum path between candidate points $S_p$ and $S_q$ by using the Dijkstra method or the like. Further, the representative point selection means 40 stores the connection path of candidate points between the candidate points $S_p$ and $S_q$ when the value becomes the maximum. Accordingly, as illustrated in FIG. 12A, an optimum path is determined from the connection paths of various candidate points between the candidate points $S_p$ and $S_q$. The optimum path connects the candidate points smoothly through another candidate point or other candidate points.

Accordingly, the representative point selection means 40 can calculate the pairwise term in the formula (1) based on the formula (3). When the value of the formula (1) is maximized, if e_global and e_local in the formula (3) are independent from each other, the term of max(Σe_local) is uniquely determined with respect to the candidate points $S_p$ and $S_q$. Therefore, if a minimum path is obtained for each of all combinations of candidate points in advance, it is sufficient if an ordinary graph matching problem is solved later. However, the present invention is not limited to such an embodiment. In the formula (3), e_global may be defined so that the energy is set in such a manner to depend on the path selected by max (Σe_local).

Further, in a manner similar to the first embodiment, the representative point selection means 40 may define each variable term in such a manner that a combination of candidate points minimizing the value of the formula (1) is selected as a representative point. Specifically, the unary term and the pairwise term may be regarded as evaluation values of cost. The unary term and the pairwise term may be defined in such a manner that the evaluation value becomes smaller as the degree of correspondence for each training label and the degree of correspondence of relative relationships between the training labels are higher. Further, max(Σe_local) in the formula (3) should be replaced by min(Σe_local). Here, e_local represents a cost for connecting the two other candidate points $S_i$ and $S_j$ that are directly connected to each other when the other candidate points between the candidate points $S_p$ and $S_q$ are traced to connect the candidate points $S_p$ and $S_q$, which are associated with training labels. Σe_local represents the total value of e_local for all pairs of two candidate points that are directly connected to each other in the path between the candidate points $S_p$ and $S_q$. Σe_local should represent the cost of the whole path between the candidate points $S_p$ and $S_q$. Further, min(Σe_local) should represent the minimum value of Σe_local in the path connecting various candidate points between the candidate points $S_p$ and $S_q$. Specifically, min (Σe_local) should represent the cost value when the candidate points $S_p$ and $S_q$ are connected through other candidate points at the minimum cost.

The structure detection means 50 detects the structure M based on the representative points selected by the representative point selection means 40 and the optimum path connecting, through other candidate points, the representative points directly connected to each other. The optimum path has been calculated by the representative point selection means 40 in calculation of max(Σe_local), and stored in a predetermined memory area of the structure detection apparatus 1. Further, as illustrated in FIG. 12B, the optimum path connects the representative points in such a manner that a point or points are interpolated to a portion in which the intervals of the candidate points are wide because of the presence of a defect region $R_L$, such as a lesion.

Here, when the set form $M_{ref}$ does not represent the whole structure M of the detection target, the structure detection means 50 detects the whole structure M by connecting, by using the minimum spanning tree algorithm, candidate points that are not used in the optimum path between the representative points. At this time, when a distance between candidate points is greater than or equal to a predetermined value, the candidate points are not connected to each other. Further, a group of candidate points that is finally not connected to the part of the structure M detected based on the set form $M_{ref}$ is treated as not belonging to the structure M. In contrast, when the set form $M_{ref}$ represents the whole structure M of the detection target, the candidate points that are not used in the optimum path between the representative points represent the excess region (for example, the pulmonary blood vessel, cardiac muscle, or the like), which does not belong to the structure M of the detection target. Therefore, connection processing is not necessary. Further, as described in the first embodiment of the present invention with reference to FIGS. 5B and 10, in both of the cases, the set form $M_{ref}$ may include another structure (coronary vein or the like, for example), which is different from the detection target structure M (structure M to be detected) in such a manner that the other structure (coronary vein or the like) is distinguishable from the detection target structure M. Further, the structure detection means 50 may treat a group of candidate points corresponding to training labels representing the other structure, as not belonging to the structure M.

As described, in the second embodiment of the present invention, the set form $M_{ref}$ further represents information about the connection relationship between training labels, in addition to the attributes of each training label and the relative relationship of the attributes between the training labels. The representative point selection means 40 selects the representative point, considering an evaluation value (cost) when other candidate points are selectively traced to connect the two candidate points associated with the two training labels that are connected to each other in such a manner that the evaluation value representing the desirability of connection is maximized (the connection cost is minimized). The structure detection means 50 detects the structure M based on the manner of tracing the candidate points to connect the representative points determined by the representative point selection means 40. Therefore, advantageous effects similar to those of the first embodiment are achieved. Further, since the desirability of connection between the representative points is considered to select the representative points, the accuracy of detecting the structure M is further improved.

Specifically, it is possible to determine the optimum path between the representative points at the same time as selecting the representative points without connecting the candidate points by using the Minimum Spanning Tree algorithm or the like. Further, since the candidate points between the representative points are connected by shortest path search, it is possible to prevent, in a manner similar to the modification example of the first embodiment, disconnection or non-shortest connection in a defect region and excessive connection in the excess region.

The embodiments of the present invention are not limited to the aforementioned embodiments. For example, in the aforementioned embodiments, a case in which the structure M is the coronary artery was described as an example, and the set form storage means DB stores the set form (energy function) with respect to the coronary artery, which is the structure M. However, the present invention may be utilized in extraction of tracheae, intestines, cerebral blood vessels, pulmonary blood vessels, hepatic blood vessels, bronchus, or the like. In this case, the set form storage means DB stores the set form for the structure M, such as the cerebral blood vessels, other than the coronary artery, and the representative points are selected by using the set form appropriate for the kind of the structure M.

So far, the present invention has been described using a 3D medical image as target of processing. Alternatively, the present invention may be applied to processing of a 2D photographic image. For example, a structure to be extracted is defined as a human face, and representative points composing the outlines of an eye or eyes, a nose, or a mouth are defined as set form. Consequently, even if the structure is not clearly visible because of the lighting conditions and an object that blocks the subject of photography, the form model can compensate or correct a defect portion that has not been detected as a candidate point. Hence, it is possible to accurately detect the form of the structure.

Further, a comment or the like may be inserted based on the position of the structure M extracted by the structure detection means 50. The comment may be inserted by using a technique disclosed in Japanese Patent No. 2707369 or the like.

What is claimed is:

1. A structure detection apparatus for detecting a predetermined structure in image data, the apparatus comprising:
a candidate point extraction means that extracts a plurality of candidate points belonging to the predetermined structure from the image data;
a set form storage means that stores, in advance, a set form composed of a plurality of training labels, the set form representing a known form of the predetermined structure;
a representative point selection means that selects, from the plurality of candidate points extracted by the candidate point extraction means, a plurality of representative points corresponding to the plurality of training labels respectively, the plurality of representative points composing a form model that is the same as or most similar to the set form stored in the set form storage means; and
a structure detection means that detects the predetermined structure in the image data by using the form model composed of the plurality of representative points selected by the representative point selection means, and the plurality of candidate points;
wherein the set form represents the position of each of the plurality of training labels and information about a positional relationship between the plurality of training labels, and wherein the representative point selection means selects the plurality of representative points by calculating, with respect to each combination of each of the training labels and the candidate points associated with the training labels, the degrees of correspondence between the positions of the training labels and the positions of the candidate points associated with the training labels respectively and the degree of correspondence of a positional relationship between the training labels and a positional relationship between the candidate points associated with the training labels respectively, and by determining a combination of each of the training labels and the candidate point that has the highest degree of correspondence between the positions thereof and the highest degree of correspondence between the positional relationships.

2. A structure detection apparatus, as defined in claim 1, wherein the candidate point extraction means detects a region having an image characteristic of the predetermined structure in the image data without using the set form, and extracts the plurality of candidate points from the detected region.

3. A structure detection apparatus, as defined in claim 1, wherein the set form further represents information about a connection relationship between the training labels, and wherein the representative point selection means determines, for each of the combinations, a path between two of the candidate points associated with two of the training labels that should be connected to each other in such a manner to selectively trace a plurality of candidate points including a candidate point that is not associated with the training label in the combinations so that a cost based on a predetermined index value becomes lowest, and calculates the degree of correspondence of the positional relationships further by taking the cost for the path into consideration, and wherein the structure detection means detects the predetermined structure based on a manner of tracing the candidate points between the representative points in the combinations determined by the representative point selection means.

4. A structure detection apparatus, as defined in claim 1, wherein the structure detection means detects the predetermined structure by correcting a form that connects the plurality of candidate points by using the form model that connects the representative points in such a manner to form substantially the same form as the set form.

5. A structure detection apparatus, as defined in claim 4, wherein the structure detection means connects the plurality of candidate points by using Spanning Tree algorithm.

6. A structure detection apparatus, as defined in claim 1, wherein when a defect region that has been detected as the predetermined structure in the form model connecting the representative points, but in which the candidate points discontinue, is present, the structure detection means detects the defect region as the predetermined structure.

7. A structure detection apparatus, as defined in claim 1, wherein when an excess region in which the candidate point has been detected, but which has not been detected as the predetermined structure in the form model, is present, the structure detection means excludes the excess region from the predetermined structure.

8. A structure detection apparatus, as defined in claim 1, wherein the representative point selection means selects, by graph matching, a set of representative points composing the form model that is the same as or most similar to the set form.

9. A structure detection apparatus, as defined in claim 1, wherein the set form storage means stores an evaluation function representing a likelihood that the candidate points form the set form, the evaluation function having been learned by using training image data that have been known to represent the predetermined structure, and wherein the representative point selection means selects the representative points by using the evaluation function.

10. A structure detection apparatus, as defined in claim 1, wherein when the predetermined structure is a blood vessel, the representative point selection means selects the representative points by using the thickness of a blood vessel and a luminance at each of the candidate points together with the coordinate of each of the candidate points.

11. A structure detection apparatus, as defined in claim 1, the apparatus further comprising:
a normalization means that normalizes, based on a predetermined reference position, the coordinates of the plurality of candidate points extracted by the candidate point extraction means.

12. A structure detection apparatus, as defined in claim 1, wherein the candidate point extraction means extracts a plurality of points from a region of the predetermined structure, and connects the extracted plurality of points to each other, and divides the extracted plurality of points into segments each having a predetermined length, and extracts the candidate points from the divided segments respectively.

13. A structure detection apparatus, as defined in claim 1, wherein the set form is composed of a plurality of structures including the predetermined structure, the apparatus further comprising:
a display control means that displays structures detected by the structure detection means in such a manner that different structures are distinguishable from each other.

14. A structure detection apparatus, as defined in claim 1, wherein the set form includes not only the form of the predetermined structure but also the form of a structure that is different from the predetermined structure, and wherein the candidate point extraction means extracts the plurality of candidate points from the predetermined structure and the different structure, and wherein the representative point selection means selects the plurality of representative points composing the form model that is the same as or most similar to the set form, and wherein the structure detection means deletes the representative points corresponding to the different structure from the plurality of representative points, and detects the predetermined structure.

15. A structure detection apparatus, as defined in claim 1, wherein the predetermined structure is a tubular structure in a human body.

16. A structure detection method for detecting a predetermined structure in image data, the method comprising the steps of:
   extracting a plurality of candidate points belonging to the predetermined structure from the image data;
   selecting, from the extracted plurality of candidate points, a plurality of representative points corresponding to a plurality of training labels respectively, the plurality of representative points composing a form model that is the same as or most similar to a set form that is composed of the plurality of training labels, the set form representing a known form of the predetermined structure and having been stored in advance in a set form storage means; and
   detecting the predetermined structure in the image data by using the form model composed of the selected plurality of representative points, and the plurality of candidate points;
   wherein the set form represents the position of each of the plurality of training labels and information about a positional relationship between the plurality of training labels, and wherein the plurality of representative points are selected by calculating, with respect to each combination of each of the training labels and the candidate points associated with the training labels, the degrees of correspondence between the positions of the training labels and the positions of the candidate points associated with the training labels respectively and the degree of correspondence of a positional relationship between the training labels and a positional relationship between the candidate points associated with the training labels respectively, and by determining a combination of each of the training labels and the candidate point that has the highest degree of correspondence between the positions thereof and the highest degree of correspondence between the positional relationships.

17. A non-transitory computer-readable recording medium storing therein a structure detection program for causing a computer to execute processing for detecting a predetermined structure in image data, the program comprising the procedures of:
   extracting a plurality of candidate points belonging to the predetermined structure from the image data;
   selecting, from the extracted plurality of candidate points, a plurality of representative points corresponding to a plurality of training labels respectively, the plurality of representative points composing a form model that is the same as or most similar to a set form that is composed of the plurality of training labels, the set form representing a known form of the predetermined structure and having been stored in advance in a set form storage means; and
   detecting the predetermined structure in the image data by using the form model composed of the selected plurality of representative points, and the plurality of candidate points;
   wherein the set form represents the position of each of the plurality of training labels and information about a positional relationship between the plurality of training labels, and wherein the plurality of representative points are selected by calculating, with respect to each combination of each of the training labels and the candidate points associated with the training labels, the degrees of correspondence between the positions of the training labels and the positions of the candidate points associated with the training labels respectively and the degree of correspondence of a positional relationship between the training labels and a positional relationship between the candidate points associated with the training labels respectively, and by determining a combination of each of the training labels and the candidate point that has the highest degree of correspondence between the positions thereof and the highest degree of correspondence between the positional relationships.

* * * * *